United States Patent [19]
Malladi

[11] Patent Number: 5,598,541
[45] Date of Patent: Jan. 28, 1997

[54] NODE LOOP PORT COMMUNICATION INTERFACE SUPER CORE FOR FIBRE CHANNEL

[75] Inventor: Srinivasa R. Malladi, Santa Clara, Calif.

[73] Assignee: LSI Logic Corporation, Milpitas, Calif.

[21] Appl. No.: 329,032

[22] Filed: Oct. 24, 1994

[51] Int. Cl.$^6$ .................................................... G06F 15/17
[52] U.S. Cl. ............... 395/286; 395/185.02; 395/200.17; 395/200.21
[58] Field of Search .................................. 370/59, 85.15, 370/94.1; 395/200.17, 200.21, 286, 185.02

[56] References Cited

U.S. PATENT DOCUMENTS

| | | | |
|---|---|---|---|
| 5,007,051 | 4/1991 | Dolkas et al. | 370/85.1 |
| 5,136,584 | 8/1992 | Hedlund | 370/94.1 |
| 5,463,762 | 10/1995 | Morrissey et al. | 395/185.02 |
| 5,490,007 | 2/1996 | Bennett et al. | 359/139 |

OTHER PUBLICATIONS

Fibre Channel: Connection to the Future, Fibre Channel Assoc., 1994, Chapters 1-3, pp. 1-20.
Fibre Channel—Physical and Signaling Interface (FC–PH), Rev. 4.1, Working Draft Proposed American National Standard for Information Systems, Aug. 12, 1993, pp. i-28.
Fibre Channel—Arbitrated Loop (FC–AL), Rev. 4.2, Working Draft Proposal American National Standard for Information Systems, Mar. 11, 1994, pp. i-8.

Primary Examiner—Kenneth S. Kim
Attorney, Agent, or Firm—Townsend and Townsend and Crew LLP; Henry K. Woodward

[57] ABSTRACT

A flexible architecture for the Super Core for implementing the FC-1 transmission protocol and the FC-2 signalling (framing) protocol in a 1.0625 Gbit/second Fibre Channel, which realizes 80 Mbytes/second sustained throughput. The architecture supports multiple, concurrent, open, and active exchanges and sequences with the use of an embedded control processor with all necessary time-critical functions performed in hardware and less critical performed by the embedded processor firmware.

11 Claims, 7 Drawing Sheets

Local Buffer and Host Interface

NODE LOOP PORT COMMUNICATION INTERFACE SUPER CORE FOR FIBRE CHANNEL

CROSS-REFERENCE TO RELATED APPLICATIONS

This application is related to copending application Ser. No. 08/327,745 filed Oct. 24, 1994 for NODE LOOP PORT CORE, assigned to the present assignee.

BACKGROUND OF THE INVENTION

This invention relates generally to data communication and processing, and more particularly the invention relates to a Node Loop Port Super Core which is flexible in structure and in operation in implementing the Fibre Channel Standard as adopted by ANSI.

The Fibre Channel Standard (FCS) as adopted by ANSI provides a low cost, high speed interconnect standard for workstations, mass storage devices, printers, and displays. The Fibre Channel (FC) is ideal for distributed system architectures and image intensive LANs and clusters. FC is media independent and provides multi-vendor interoperability.

Current FC transfer rates exceed 100 Mytes per second in each direction. FC data transfer rates can also be scaled to 50, 25, and 12.5 Mbytes per second. The aggregate bandwidth is unlimited in the switch based topologies.

Fibre Channel technology provides a single interface that supports both channel and network connections for both switched and shared mediums. FC simplifies device interconnections and software, and reduces hardware costs since each device needs only a single FC port for both channel and network interfaces. Network, point to point, and peripheral interfaces can be accessed through the same hardware connection with the transfer of data of any format for the sending device buffer to the receiving device buffer.

FCS can also be implemented using a low-cost arbitrated loop configuration. The aggregate bandwidth is limited by the FC maximum bandwidth, but this is the best configuration for controlling disk arrays. The Node Loop Port (NL_Port) provides the necessary functions for arbitrated loop.

FIGS. 1A–1D illustrate several topologies for implementing the Fibre Channel.

FIG. 1A illustrates a Point-to-Point topology. FIG. 1B shows a simple fabric topology. FIG. 1C shows a Closed Arbitrated Loop, and FIG. 1D illustrates an Open Arbitrated Loop. The fabric link in FIG. 1D uses circuit switching much like a telephone network. The FC creates multiple, temporary, direct connections that each provide full bandwidth. Further, the bandwidth can be expanded by adding more paths.

A Fibre Channel Fabric can be as simple as a single cable connecting two devices or as complex as a large number of FC switches incorporating both circuit and packet switching that connect up to 16,000,000 devices. A device attached to an FC fabric can transmit data to any other device and receive data from any other device attached to the fabric.

An FC fabric uses circuit switching much like a telephone network. The FC creates multiple, temporary, direct connections that each provide the full bandwidth. Each connection can use the entire bandwidth so it does not become congested by adding more workstations and peripherals. The bandwidth can be expanded by adding more paths.

The FC hardware routes the transmissions. A device connected to the fabric that wants to transmit requests connection to the receiving device. The FC attempts to route the call by querying the availability of the receiving device. If the device responds that it is available, the FC confirms the route back to the sending device. If the connection fails, the FC re-routes the transmission.

Setting up frequent connections is not time intensive (less than 10 μs per connection).

Every Node Port logs in with the port to which it is attached, either an F_Port or an N_Port.

The Fibre Channel Standard includes bridges and routers that can simultaneously transport other data communications protocols, so already existing devices need only be enhanced by attaching adapters rather than being replaced. The FCS provides for new media technologies to be easily added. Currently the FCS provides interconnection to the following higher-level protocols:

FDDI (Fibre Distributed Data Interface

HIPPI (High Performance Parallel Interface)

SCSI (Small Computer Systems Interface)

IPI (Intelligent Peripheral Interface)

IBM's Block Multiplexer Channel

ATM (In process)

FC is a solution to the following applications that require large volume information storage and transfers:

Medical Imaging

Engineering CAD

Scientific Visualization

Computer Generated 3D Animation and Full-motion Video

Simulation

Multimedia

Video Conferencing

Image-based Document Storage and retrieval

Large Transaction Databases

Off-site Large Volume Backups—decouples mass storage from CPU—simple, quick, offsite backup Communications Channels for Supercomputer Emulation (workstation clustering)

These applications require data transfers up to 755 Mbits per second (30 32-bit color 1024×768 pixel images per second) uncompressed. Most of the current connection technologies are unable to transfer data fast enough to meet these needs. Fibre Channel can transfer uncompressed video data at rates that can generate full-screen real-time color displays.

The following tables define the Fibre Channel Standard (FCS levels (layers).

| FC Level | Description | Defines: |
|---|---|---|
| FC-0 | Physical Interface | Optical and electrical parameters for interfacing to a variety of physical media that operate over a wide range of data rates |
| FC-1 | Transmission Protocol | Serial encoding, decoding, and error control (8-bit/10-bit code) |
| FC-2 | Signaling (Framing) Protocol | Frame structures and byte sequences used by FC-4 to transfer data (transport mechanism) |
| FC-3 | Common Services | a set of services that are common across multiple N_Ports of an FC node |
| FC-4 | Mapping to | Software mapping between the FC |

| FC Level | Description | Defines: |
|---|---|---|
| | Upper-Level Protocols | lower levels (FC-0,1,2,3) and the upper-level protocols (IP13, SCSI, IP etc.) |

Following are brief definitions of some of the FCS Framing Protocol (FC-2) terminology.

Two possible FC frame formats with FC frames being separated from each other by at least six word (four-byte) IDLEs.

Following are illustrations of two Fibre Channel frames with a table defining the frame fields:

| SOF | FHDR | Payload | | CRC | EOF |
|---|---|---|---|---|---|
| | | or | | | |
| SOF | FHDR | OHDR | Payload | CRC | EOF |

| Mnemonic | Definition | Size (Bytes) |
|---|---|---|
| SOF | Start of Frame | 4 |
| FHDR | Frame Header | 24 |
| OHDR | Optional Headers | 64 or 0 |
| Payload | Data | 2112 or 2048 |
| CRC | Frame Error Check | 4 |
| EOF | End of Frame | 4 |

Each frame is an indivisible unit of information used by the Signaling protocol (FC-2) and there are four major FC-2 frame types:

Device_Data frames carry data of the upper level protocol type.

Link_Data frames which carry a built-in protocol called Link_Services.

Link_Control frames which implement flow control, error detection, and error handling functions.

Video_Data frames which carry video data that is directed to a video buffer.

The following table shows the FC-2 Frame Header (FHDR) structure:

| Word | Byte 1 | Byte 2 | Byte 3 | Byte 4 |
|---|---|---|---|---|
| 1 | R_CTL | | DESTINATION ID | |
| 2 | Reserved | | SOURCE ID | |
| 3 | TYPE | | F_CTL | |
| 4 | SEQ_ID | DF_CTL | SEQ_CNT | |
| 5 | OX_ID | | RX_ID | |
| 6 | PARAMETER | | | |

The following table defines the FHDR R_CTL routing bits.

| R_CTL[7:4] | Frame Definition |
|---|---|
| 0000 | FC-4 Device_Data |
| 0010 | Extended Link_Data |
| 0011 | FC-4 Link_Data |
| 0100 | Video_Data |
| 1000 | Basic Link_Data |
| 1100 | Link_Control |
| All Others | Reserved |

FIG. 2 is a functional block diagram of the NL Core 10 and the Super Core 12 which implement the FC-1 and FC-2 transmission and signalling protocols of the Fibre Channel standard. Heretofore, these protocols have been implemented with application specific integrated circuits (ASIC) with a host computer This structure requires large and complex logic and has proved to be limited in achieving the 80 Mbytes/sec sustained throughput required.

The present invention provides a modular structure for the Super Core with an embedded processor which supports a full featured Fibre Channel operation at the 80 Mbytes/sec sustained throughput. The structure can be designed into an ASIC with custom specific functions appended thereto.

SUMMARY OF THE INVENTION

Briefly, a flexible, modular architecture is provided for implementing the transmission and framing protocols in a Node Loop Port Super Core for the Fibre Channel Standard.

The modules of the Super Core include a node loop (NL) core for encoding and decoding data to and from the optical fibre or coaxial copper transmission line and for providing basic functions such as CRC checking and generation, frame parsing and steering, and primitives detection and generation.

Connected to the NL Core are Receive Buffer Logic (RBL) and Transmit Buffer Logic (TBL) which provide necessary control to write frame headers and data to respective buffers based on programmed steering. Storage buffers are provided for headers and link frames and for payload (PL) data.

Buffer status register files are interconnected with the RBL and TBL to store the status of various header and link staging buffers.

A Receive Sequence State Machine (RSSM) provides the frame level processing in the receive path, and is connected to the NL core and RBL and a direct memory access controller (DMAC1) for supporting the sequence and exchange of data frames to memory. A Transmit Sequence State Machine (TSSM) provides the frame level processing in the transmit path, and is connected to a direct memory access controller (DMAC2) and NL Core and TBL for supporting the sequence and exchange of data frames from memory.

An Exchange and Sequence Management Buffer Logic (ESMBL) is connected to the RSSM and TSSM to provide necessary control to write and read exchange and sequence status information and provide storage buffers for exchange and sequence information.

An embedded processor (MIPS) is connected with the ESMBL, RSSM, TSSM, and DMACs for providing necessary support processing and allocation of memory area for blocks and sub-blocks of information, exchange status blocks, sequence status blocks, and quick access tables for sequences and exchanges.

DMAC1 and DMAC2 provide the data transfer interfaces between all receive activated blocks and transmit activated blocks respectively.

The invention and objects and features thereof will be more readily apparent from the following detailed description and appended claims when taken with the drawing.

DETAILED DESCRIPTION OF ILLUSTRATIVE EMBODIMENT

The Super Core in accordance the invention presents an elegant and flexible architecture for 1.0625 Gbit/second Fibre Channel, which attains 80 Mbytes/second sustained throughput. The architecture supports all classes of service and intermix, control models and topologies as described in the Fibre Channel Standard. The architecture also supports multiple concurrent open and active exchanges and sequences with the use of the embedded control processor. Importantly, all the necessary time-critical FC-1 and FC-2functions are identified and performed in hardware while noncritical functions can be performed by the embedded processor firmware. System performance can be tuned by increasing the local memory size.

Figure 1A:
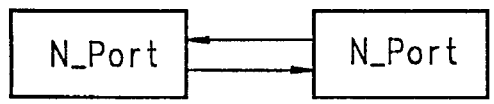
FIGS. 1A, 1B 1C, and 1D are functional block diagrams illustrating various topologies of the Fibre Channel.
Figure 1B:
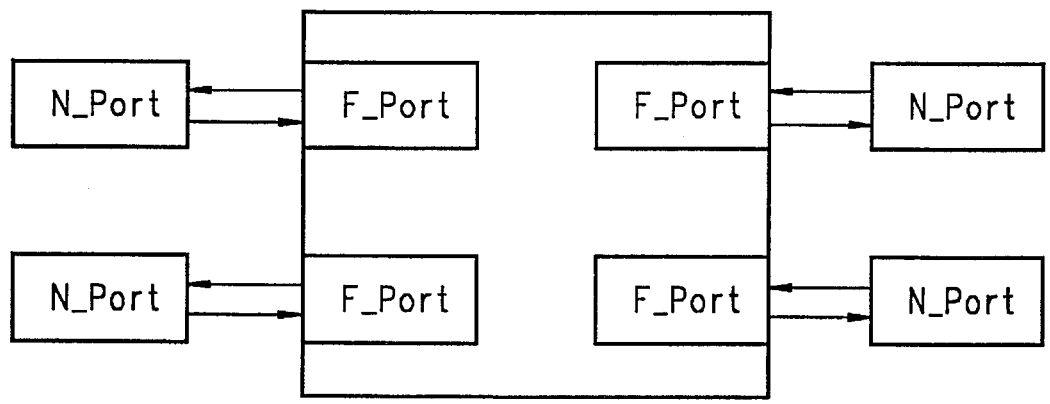
Figure 1C:
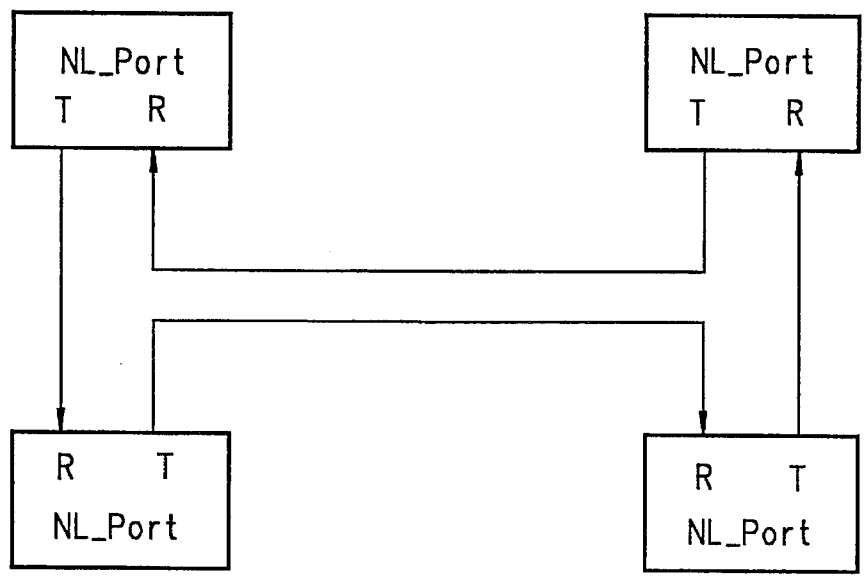
Figure 1D:
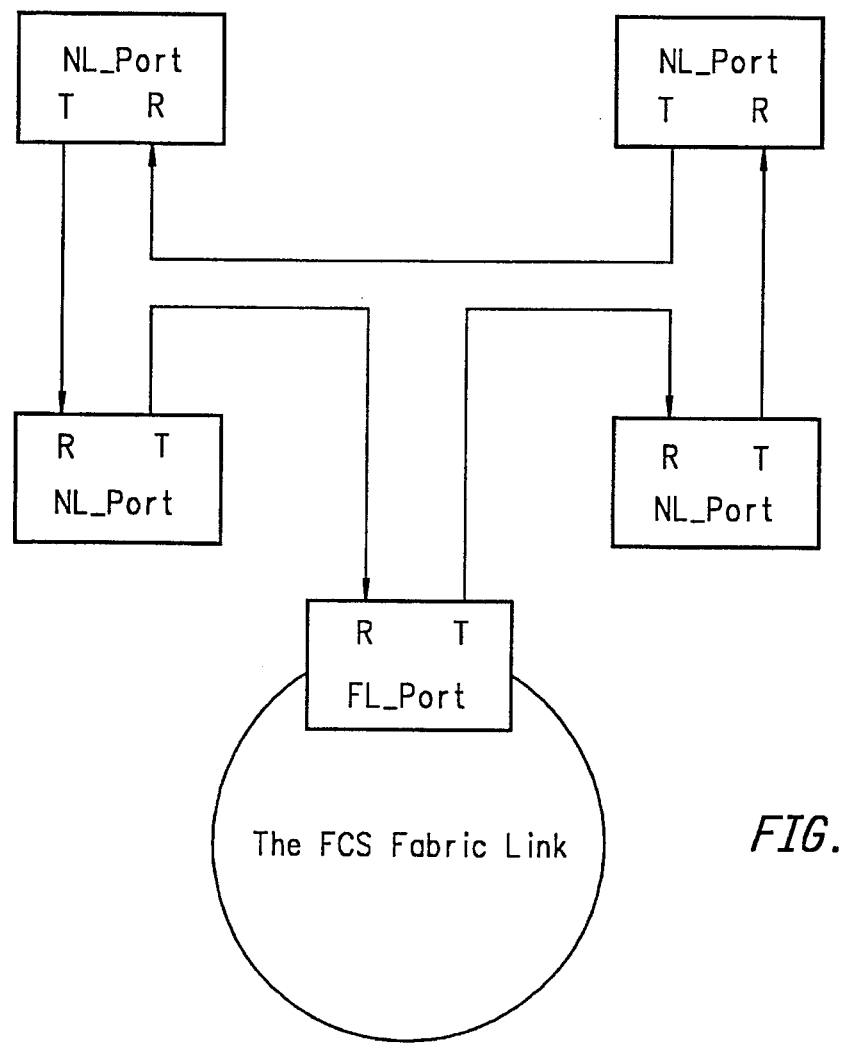
Figure 2:
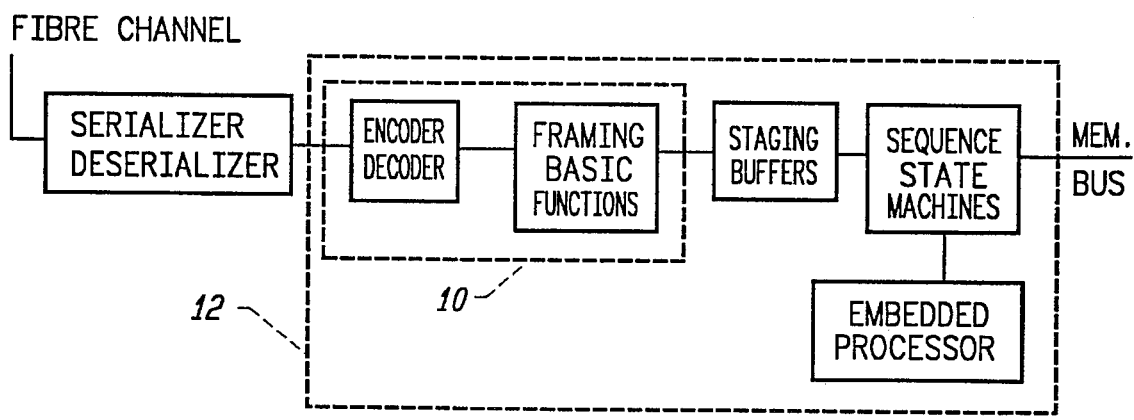
FIG. 2 is a functional block diagram of the NL Core and Super Core in implementing the transmission and framing protocols of the Fibre Channel Standard.
Figure 3:
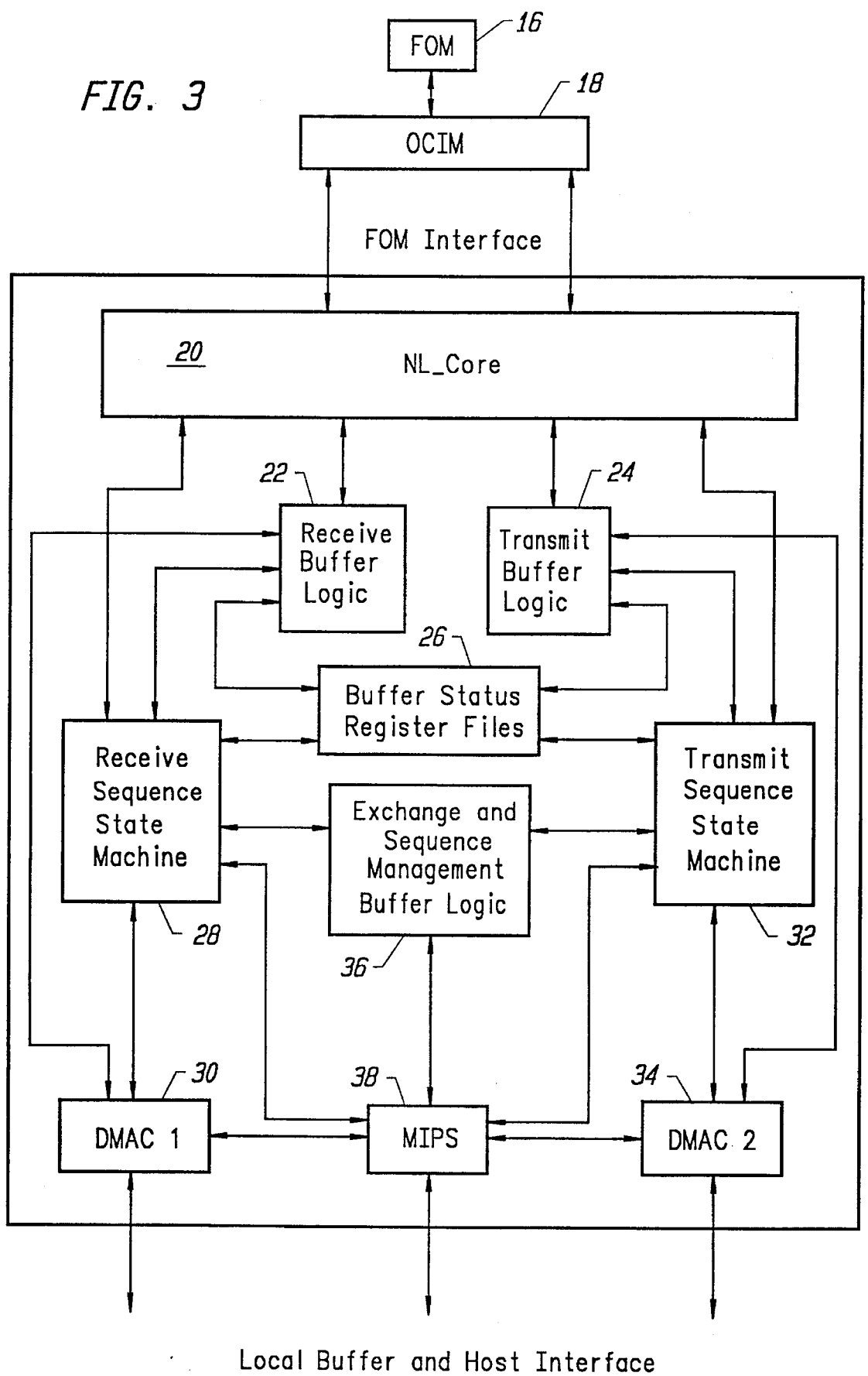
FIG. 3 is a functional block diagram of a Super Core in accordance with the present invention.

A Super Core for implementing the transmission and framing protocols of the Fibre Channel Standard is illustrated in the functional block diagram of FIG. 3. The modules of the Super Core include a node loop (NL) core 20 which is connected to the transmission line through an optics or copper interface module (OCIM) which provides a physical interface and a conversion of serial data to parallel (deserializer) any parallel data to serial bitstream (serializer) in accordance with the FCS. NL Core 20 is described in detail in copending application Ser. No. 11728-44, supra, and encodes and decodes data to and from the fibre optic module 16 and providing basic functions such as CRC checking and generation, frame parsing and steering, and primitives detection and generation.

A Receive Buffer Logic (RBL) 22 and Transmit Buffer Logic (TBL) 24 are connected to the NL Core 20 and provide necessary control to write frame headers and data to respective buffers based on programmed steering. Storage buffers are provided for headers and link frames and for payload data.

Buffer Status Register Files 26 interface to RBL 22 and TBL 24 to store the status of various header and link staging buffers.

Receive Sequence State Machine (RSSM) 28 provides the frame level processing in the receive path, and is connected to NL Core 20 and RBL 22 and a Direct Memory Access Controller (DMAC1) 30 for supporting the sequence and exchange of data frames to memory. A Transmit Sequence State Machine (TSSM) 32 provides the frame level processing in the transmit path, and is connected to a Direct Memory Access Controller (DMAC2) 34 and NL Core 20 and TBL 24 for supporting the sequence and exchange of data frames from memory.

An Exchange and Sequence Management Buffer (ESMBL) 36 is connected to RSSM 28 and TSSM 32 to provide necessary control to write and read exchange and sequence status information and provide storage buffers for exchange in sequence information.

An embedded processor (MIPS) 38 is connected with ESMBL 36, RSSM 28, TSSM 32, and the DMACs 30–34 for providing necessary support processing and allocation of memory area for blocks and sub-blocks of information, exchange status blocks, sequence status blocks, and quick access tables for sequences and exchanges.

DMAC1 and DMAC2 provide the data transfer interfaces between all receive activated blocks and transmit activated blocks.

Figure 4:
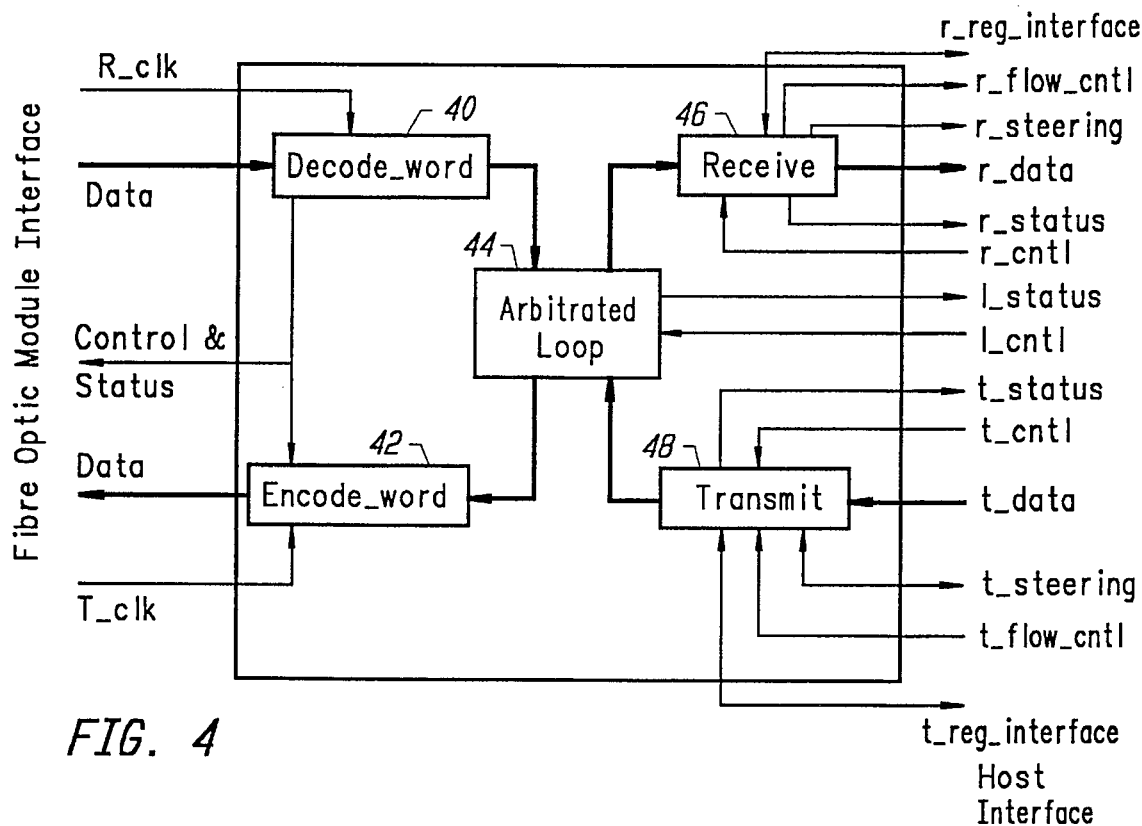
FIG. 4 is a functional block diagram of the NL Core.

FIG. 4 is a functional block diagram of NL Core 20, a detailed description of NL Core is in copending application 11728-44, supra. The principal sub-blocks of NL Core are decode word 40, encode word 42, arbitrated loop 44, receive 36, and transmit 48. Decode word 40 and encode word 42 receive and transmit data, respectively, through the fibre optic module interface and transmit control and status signals to the interface while receiving clock signals from the interface. Decode word 40 functions include conversion of 10-bit to 8-bit data with error checking, k character recognition, and the construction of 32-bit parity protected words from half-words or bytes as programmed for 20-bit or 10bit fibre optic interface.

Encode word 42 functions include conversion of 8-bit to 10-bit encoded data, k character generation, and construction from 32-bit parity protected words, half-words or bytes as programmed for 20-bit or 10-bit fibre optic interface, after checking parity.

The arbitrated loop 44 functions include performing loop initialization protocol, loop arbitration functions, and recognition of all primitive signals and sequences pertinent to the loop. The arbitrated loop applies a loop fairness algorithm in arbitrating the loop and consists of a loop state machine and a loop buffer.

Receive block 46 functions include frame parsing, frame steering, CRC error checking, logic error checking, FCS primitive detection, and offset computation if offset if used. The receive unit also provides steering mechanisms as follows:

Steering Header Class

For Class 2 and 3 frames, all headers go into a Buffer-to-buffer frame requiring Receiver Ready, R_RDY, flow control buffer HBB (BBFLO buffer), and all payload goes to Data FIFO (Receive).

For Class 1, all headers of link control and link data frames go into a non-BBFLO local buffer.

For Class 1 Device Data frames, FCS Device Data goes into a Payload buffer and selected headers go into a HC1 local buffer. Selected headers are the headers of the first, last, and errored frames. This steering supports a single FCS solicited exchange at a time.

Steering unmodified

All information from parsed frames is presented without interpretation to Data FIFO (Receive). This allows custom steering implementation.

For class 1 Device_Data frames, the maximum FCS rate is greater than 103 Mbytes/s at 1.0625 Gigabits/s. For all other frames, the maximum FCS rate is greater than 103 Mbytes/s at 1.0625 Gigabits/s, but is determined by the target architecture buffer structure and flow control mechanisms.

The Receive has the following hardware-managed features:

Device Data frame sequence Reception (steering header class)

Sequence validity checking for class 1 device data frames.

Sequence and exchange switches on class 2 and class 3 device data frames.

R_RDY Flow Control Automatic Frame Header Discard (except for first, last, and invalid) for Class 1 Device Data frames The Receive supports the FCS Fibre Channel requirement of 6 IDLEs between frames and also supports FCS intermix.

The transmit unit 48 provides frame construction from multiple sources, CRC generation, and FCS primitive generation. The unit also implements the following transmit mechanisms:

Hardware-managed FCS Sequence (HMS) for any class
One FCS sequence active at a time
Frame header source is different from the payload
All but Device Data from a single source, usually a buffer
Bandwidth=FCS maximum (100 Mbytes/s with full-speed optics, from Device Data source
Software managed single frame for any class.

The Transmit supports the FCS Fibre Channel requirement of 6 IDLEs between frames and also supports FCS intermix.

The Transmit has the following hardware-managed features:

FCS Device Data frame sequence transmission
FCS R_RDY flow control

Figure 5:
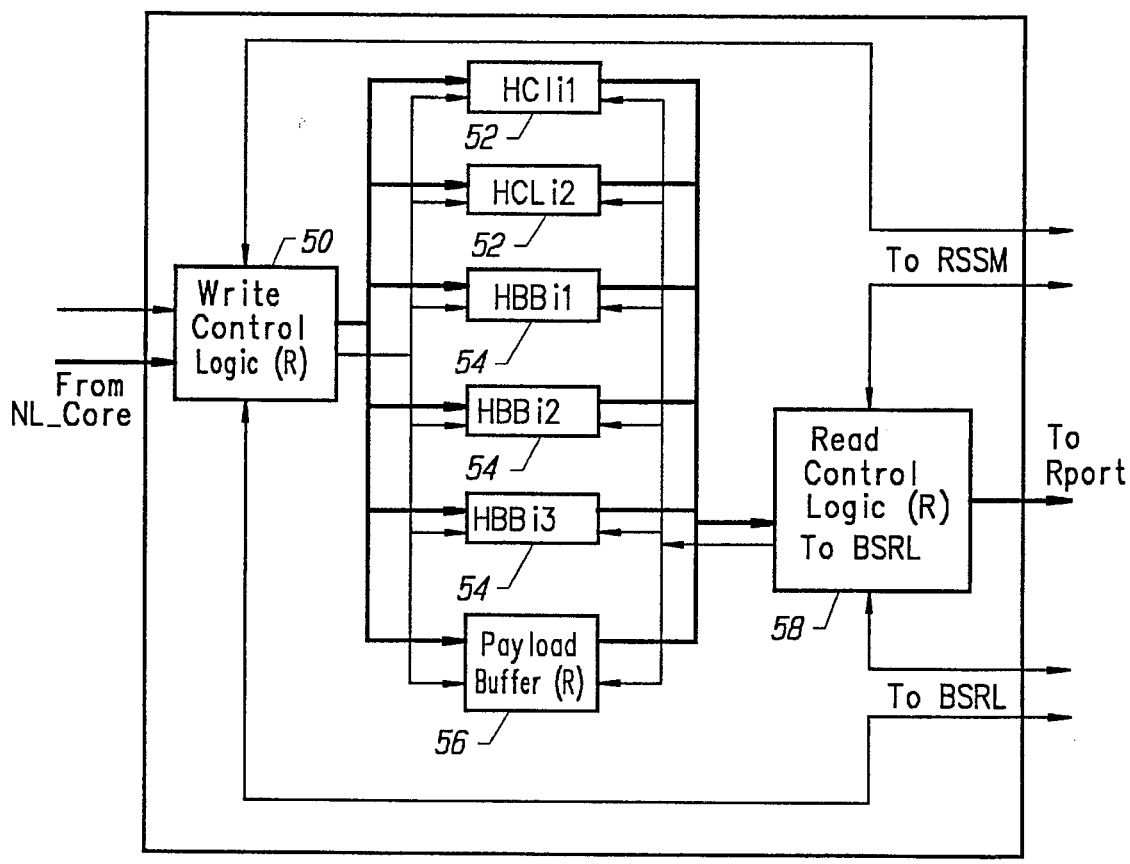
FIG. 5 is a functional block diagram of the Receive Buffer Logic.

FIG. 5 is a functional block diagram of the Receive Buffer Logic 22 of FIG. 3. The principle sub-blocks are Write Control Logic 50, HC1 buffers 52, HBB buffers 54, payload buffer 56, and read control logic 58. The primary functions of RBL include providing necessary control to write frame headers and data to respective buffers based on programmed steering, provides storage buffers for Class 1 headers and link frames (HC1), storage buffers for Class 2/3 headers and link frames (HBB), and storage buffers for payload (PL) data. RBL also provides necessary control to read the frame headers and data to respective buffers based on the steering programmed and updates the status of various buffer status registers.

The Write Control Logic 58 enables writing into receive buffers using round robin algorithm. The Write Control Logic performs write to Class 1 header buffer (HC1), BBFLO buffer (HBB), and payload buffer. The Write Control Logic receives respective buffer write control and frame steering signals from NL Core, and since there is only one active buffer write at any given time, all three types of buffers share a common address and data bus. The block has a read/write port to buffer status register files. After a write operation is complete, the Write Control Logic updates the required status bits in the buffer status register file.

The HC1 buffers 52 hold headers and entire link control frames of Class 1 service. The memory has a set of address and control bus for each port (read and write). However, the write port has data in bus and the read port has data out bus. The size of the buffer is 42 words of 36 bits (4 bytes parity protected). The number of buffers is user-definable with a minimum of two buffers.

The HBB buffers 54 hold headers and entire link control framers of Class 2/3 service. This memory has a set of address and control bus for each port (read and write). However, the write port has data_in bus and the read port has data_out bus. The size of this buffer is 42 words of 36 bits (4 bytes parity protected). The number of buffers is user-definable with a minimum of three buffers.

The payload buffer 56 holds payload of Class 1, Class 2 and Class 3 frames. This is selected to be a FIFO memory instead of a buffer memory as there is no random access necessary when reading out data. However, for HC1 and HBB buffers, the capability of reading random data enables RSSM and other downstream logic to prepare ahead for subsequent operations. The FIFO contains a write control, a read control, a write data bus and a read data bus. The FIFO has 36 bits (4 bytes parity protected) and the size is user-definable with a minimum 6K provided to accommodate a payload of 3 frames.

The read control logic 58 enables reading from buffers using a round robin algorithm. The unit has a read/write port to buffer status register file and initiates a read under the control of RSSM.

Figure 6:
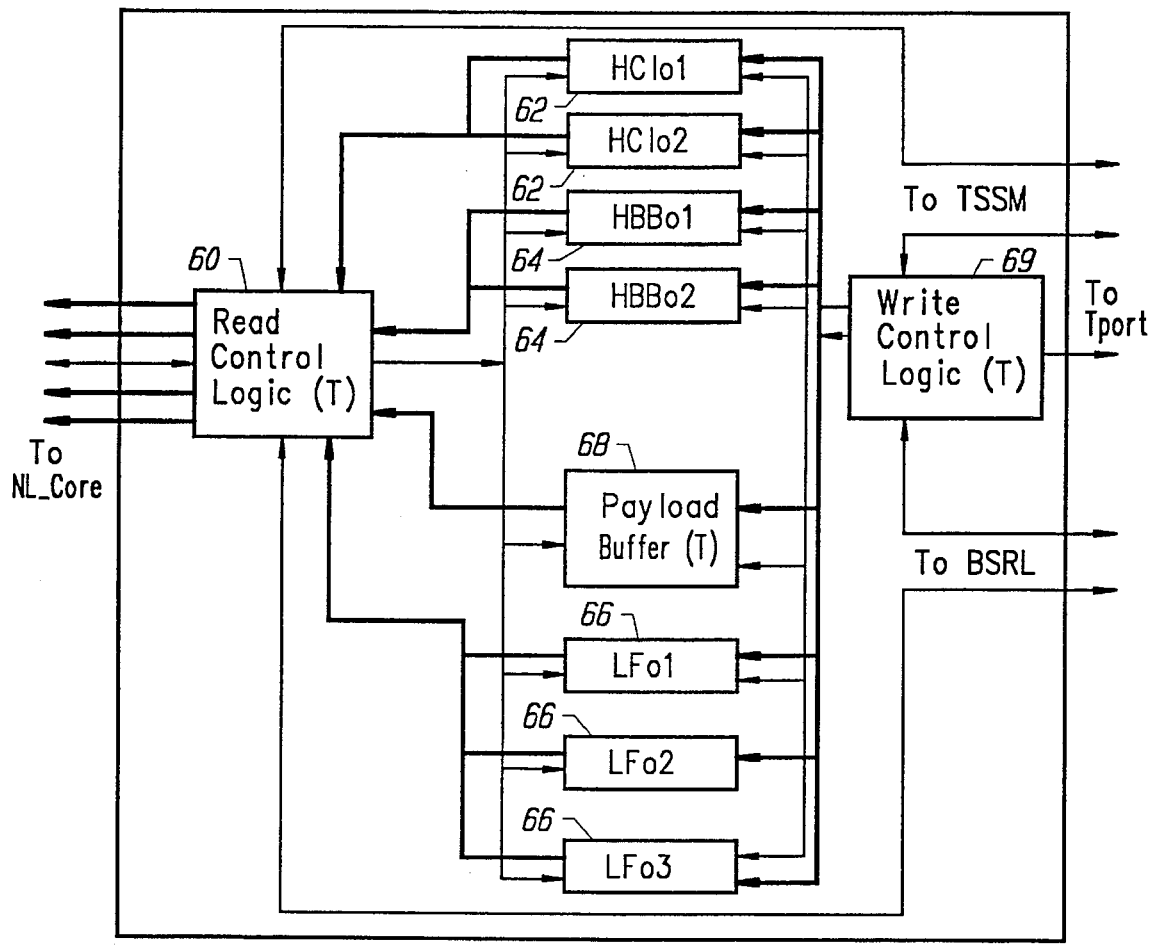
FIG. 6 is a functional block diagram of a Transmit Buffer Logic.

FIG. 6 is a functional block diagram of the Transmit Buffer Logic 24 of FIG. 3. The primary sub-blocks of the Transmit Buffer Logic are Write Control Logic (T) 60, HC1 buffers 62, HBB buffers 64, LF buffers 66, a payload FIFO 68, and read control logic (T) 69.

The Write Control Logic 69 enables writing into transmit buffers using round robin algorithm. The Write Control Logic performs writes to Class 1 header buffer (HC1), BBFLO buffer (HBB), link frame buffer (LF) and payload buffer (PL buffer). The TBL receives respective buffer write control and frame steering signals from TSSM. Since there is only one active buffer write at any given time, all three types of buffers share a common address and data input bus. This block has a read/write port to buffer status register files. After the write operation is complete, the Write Control Logic updates required status bits in the buffer status register file.

The HC1 buffers 62 hold headers and optional headers (if present) of Class 1 service to perform HMS. This memory has a set of address and control bus for each port (read and write). However, the has a data_in bus and the read port has data_out bus. The size of this buffer is 42 words of 36 bits (4 bytes parity protected). The number of buffers is user-definable with a minimum of two buffers.

The HBB buffers 64 hold headers and optional headers (if present) of Class 2/3 service, to perform HMS. This memory has a set of address and control bus for each port (read and write). However, the write port has a data in bus and the read poet has data_out bus. The size of this buffer is 42 words of 36 bits (4 bytes parity protected). The number of buffers is user-definable with a minimum of two buffers.

The LF buffers 66 hold the entire link frames to be transmitted. This memory has a set of address and control bus for each port read and write). However, the write port has data in bus and the read port has data out bus. The size of this buffer is 42 words of 36 bits (4 bytes parity protected). The number of buffers is user definable with a minimum of three buffers.

Payload buffer 68 holds payload of Class 1, Class 2, and Class 3 frames for performing HMS and also provides a path for single frame transmission. Again, a FIFO memory is used as there is no random access necessary when reading out data. The FIFO controls a write control, a read control, a write data bus, and a read data bus. The FIFO has 36 bits (4 bytes parity protected), and the size is user definable.

Read control logic 60 functions to store the status of various header and link staging buffers. The multiport register files are used and updated by Receive Buffer Logic, Receive Sequence State Machine, Transmit Buffer Logic, Transmit Sequence State Machine and MIPS. The buffer status register is of a horizontal instruction format and has all necessary frame information, several status and control bits.

The Primary functions of the Transmit Buffer Logic are as follows:

Provide necessary control to write the frame headers and data go respective buffers based on the steering programmed, i.e., WRITE pulses to various transmit buffers.

Storage buffers for class 1 headers (HC1), storage buffers for class 2/3 headers (HBB), storage buffers for link (LF) frames, and storage buffers for payload (PL) data.

Provide necessary control to read the frame headers and data to respective buffers based on the steering programmed, i.e., READ pulses to various transmit buffers.

Update the status of various buffer status registers.

Figure 7:
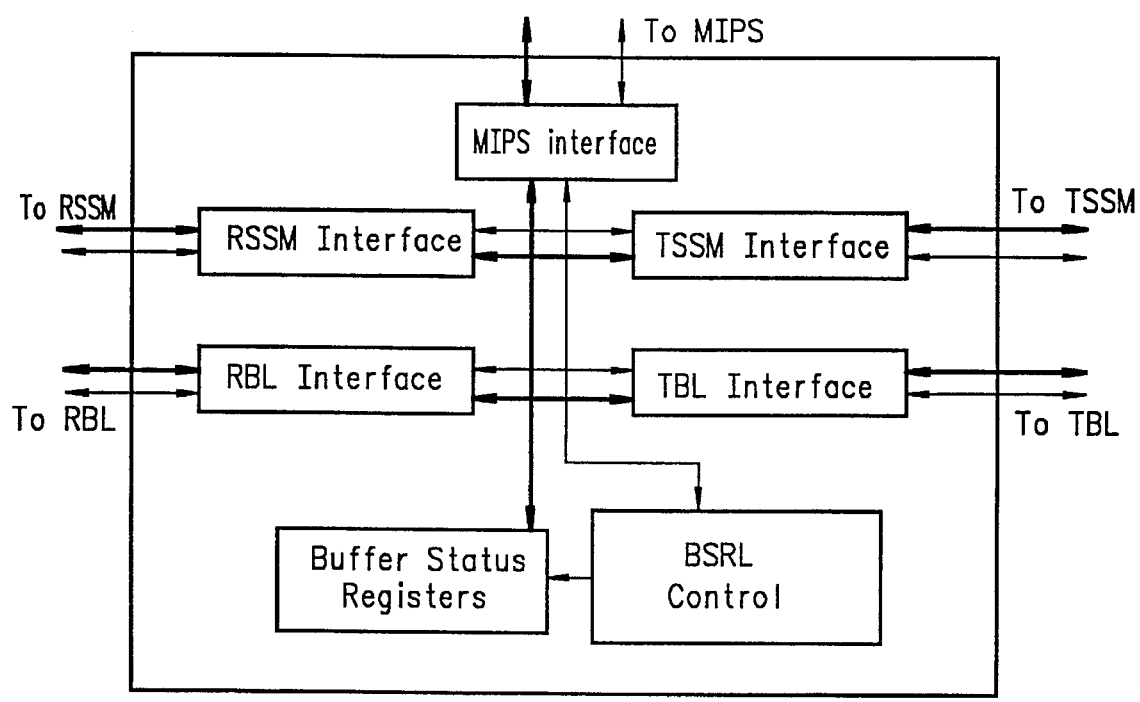
FIG. 7 is a functional block diagram of the Buffer Status Register Files.

FIG. 7 is a functional block diagram of the Buffer Status Register Logic 26 of FIG. 3. The primary function of the logic is to store the status of various header and link staging buffers. These multiport register files are used and updated by Receive Buffer Logic, Receive Sequence State Machine, Transmit Buffer Logic, Transmit Sequence State Machine, and MIPS. The Buffer Status Register is of a horizontal construction format and has all necessary frame information, as well as several status and control bits.

Figure 8:
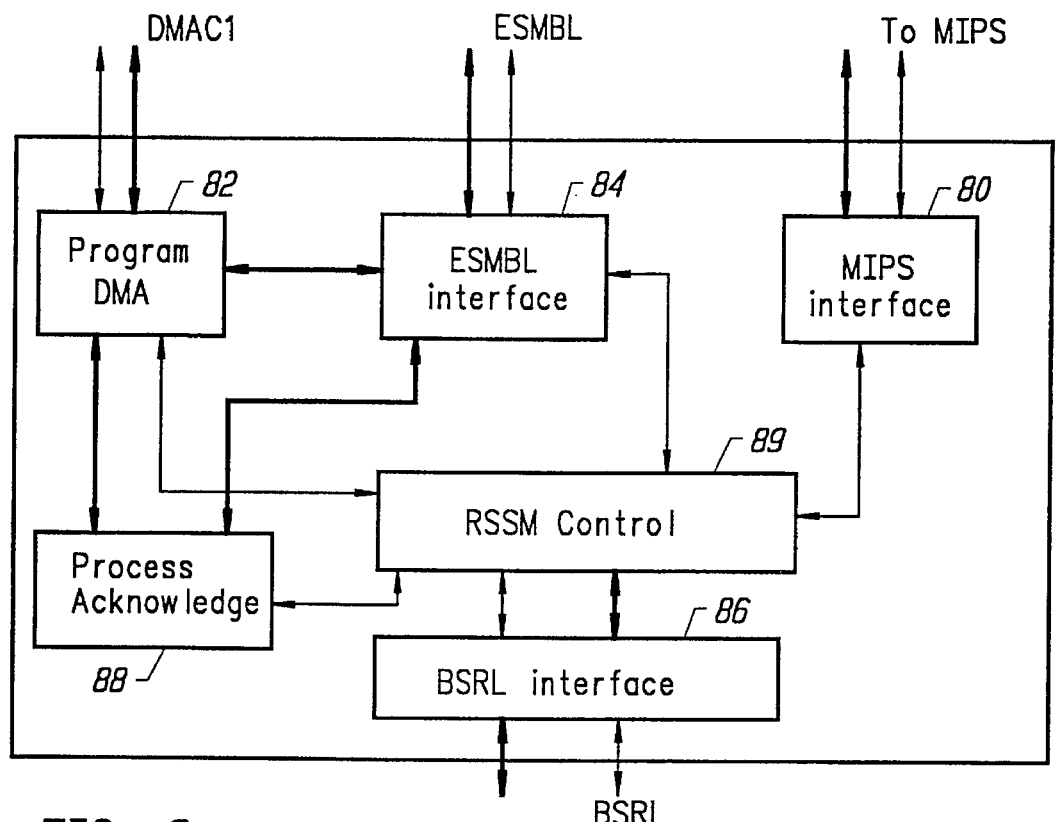
FIG. 8 is a functional block diagram of the Receive Sequence State Machine.

FIG. 8 is a functional block diagram of the Receive Sequence State Machine 28 of FIG. 3. The primary subblocks of RSSM are MIPS interface 80, program DMA 82, ESMBL interface 84, BSRL interface 86, process acknowledgement 88, and RSSM control 89. The primary functions of RSSM are:

Use EOF as an interrupt to process the frame. If offset is used, program the DMAC appropriately to store the frame data in the local memory. Updates the sequence and exchange information for the DATA frames received. Updates the sequence time-out value of the sequence timers.

Reads only the FIF formatted header for data frames.

Use sequence context switch and exchange context switch as interrupts to fetch the relevant exchange and sequence information, if this is not already available in the exchange and sequence information buffers.

If acknowledgment frame (ACK_1 or ACK_0) is received, update appropriate exchange and sequence status block. Update the end to end credit limit. Update the sequence time-out value of sequence.

Recognizes complete sequence data reception.

Generates interrupt to MIPS, when all the data frames of a sequence are received, or buffer is full to watermark level, or termination of sequence is received, or link control frames other than ACK frames received.

Figure 9:
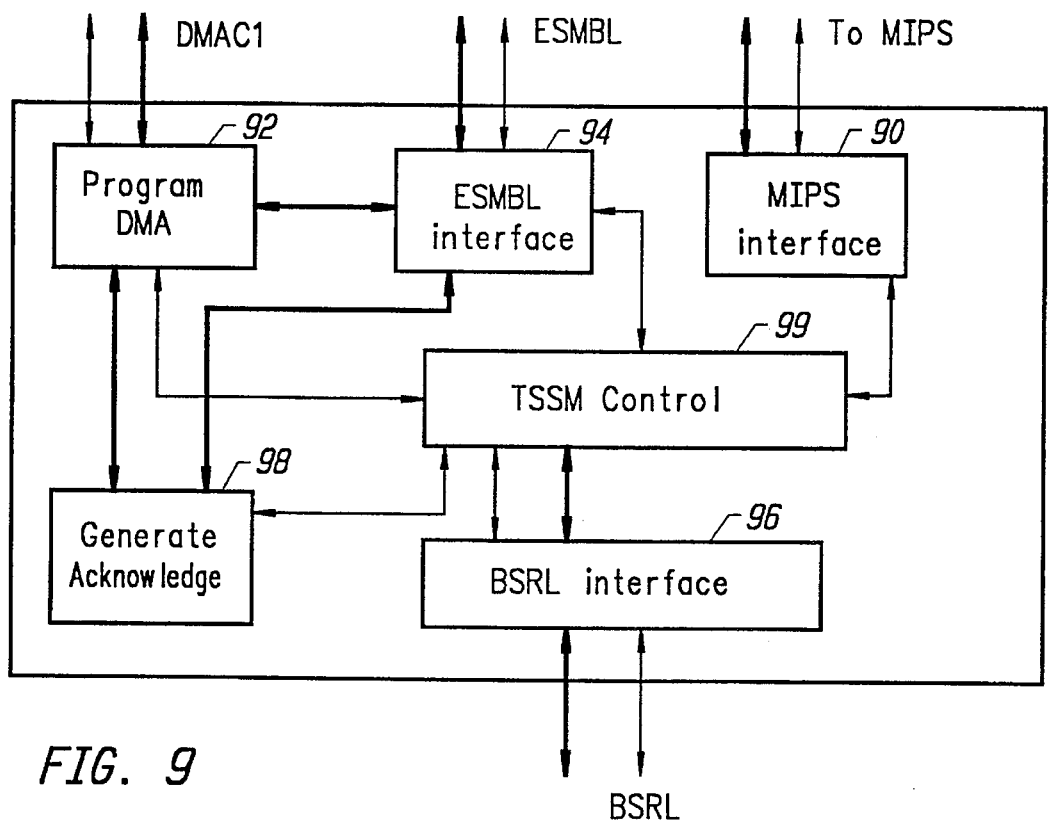
FIG. 9 is a functional block diagram of the Transmit Sequence State Machine.

FIG. 9 is a functional block diagram of the Transmit Sequence State Machine 32 of FIG. 3. The principal subblocks of the Transmit Sequence State Machine are the MIPS interface 90, program DMA 92, ESMBL interface 94, BSRL interface 96, generate acknowledge 98, and TSSM control 99. The primary functions of TSSM are:

Control transmission of sequences and link frames.

Generates acknowledgment frames (ACK_1 or ACK_0) for the received data frames, and write to LF_buffers.

Initiates the complete sequence transmission.

Programs DMAC to read local memory and write to transmit buffers.

The DMA is programmed for the transmit activated blocks. The primary functions include ACK frame to Transmit Buffer Logic, read exchange and sequence status block, if the search to ESMBL fails, and to transfer the data from local memory to staving buffers in Transmit Buffer Logic. The ESMBL interface provides interface between TSSM and ESMBL. The primary functions include accessing and updating the exchange and sequence status information of active and open exchanges and sequences, and writing the information of active and open exchanges.

The BSRL interface provides read and update interface between Buffer Status Register Logic (BSRL) and TSSM. TSSM Control accesses BSR to check availability of header buffers and link buffers. The generate acknowledgment updates the exchange and sequence information. For Class 1 and 2 data frames, header information from Receive Buffer Logic is read, and ACK_1 frame is constructed.

The TSSM control block controls all the other sub-blocks in the TSSM. The primary functions include when BSRL interface provides the availability of header buffers (HBB, HC1) and link buffers, TSSM Control programs DMA to write the header, optional header (if present) into available staging buffers. It also updates sequence and exchange information of the transmitted frame. TSSM control provides sequence identification and exchange identification to ESMBL interface to search for Sequence and exchange information. If a search fails, then the control provides SEQ_ID and X_ID to the MIPS interface. The TSSM Control also controls the Generate ACK to transmit ACK frame and update exchange and sequence information.

The MIPS interface provides interface between MIPS and TSSM with the primary functions including programming TSSM to transmit a sequence of data, a single data frame, or a link frame. It also generates and interrupt to MIPS under exceptional conditions, at the end of transmission of a frame sequence form local memory, and at the end of an exchange. It also generates interrupt to MIPS if the exchange search or sequence search on ESMBL fails.

Figure 10:
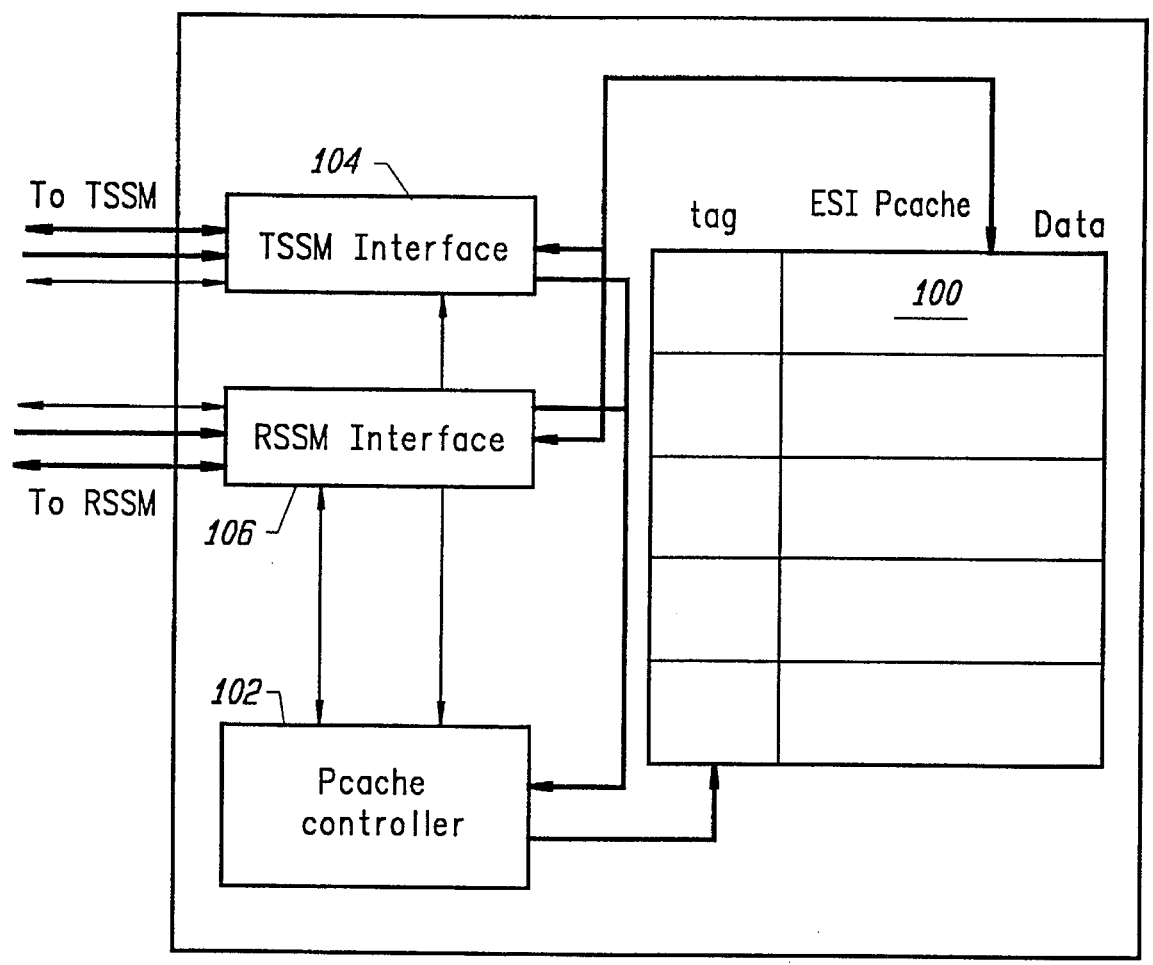
FIG. 10 is a functional block diagram of the Exchange and Sequence Management Buffer Logic.

FIG. 10 is a functional block diagram of the Exchange and Sequence Management Buffer Logic 36 of FIG. 3. The primary functions of ESMBL are to provide necessary control to write and read the exchange and sequence status information including the time stamp for sequence timers, provide a pseudo-cache buffer mechanism, and interface to both RSSM and TSSM. The sub-blocks of ESMBL include the ESI_Pcache 100, Pcache Control 102, TSSM interface 104, and RSSM interface 106.

The Pcache tag is of 32 bits and consists of X_ID and SEQ_ID (24 bits) of the sequences as address and one byte of status and control. The Cache data field is 16 bytes. The height of the cache is user defined.

Pcache control controls all of the sub-blocks of ESMBL, with the primary functions including acquiring tag (address and status) being searched by TSSM/RSSM, indicating cache hit success or fail to TSSM/RSSM when asked for exchange and sequence information, and providing read/ write control signals to Pcache.

The RSSM interface provides tag (address and status) being searched by RSSM, and acquires cache hit success or fail from Pcache Control and provides this to RSSM.

TSSM interface provides tag (address and status) being searched by TSSM and acquires cache hit success or fail from Pcache control and provides this to TSSM.

The two DMA controllers, DMAC1 and DMAC2, of FIG. 1 provide data transfer interface between all the receive activated blocks, and data transfer interface between all transmit blocks, respectively. The primary function of DMAC1 is to provide data transfer interface between all the receive activated blocks, i.e., Receive Buffer Logic (Rport), Receive Sequence State, Machine (RSport), MIPS engine (MIPSportR), Host memory port (HportR), and local memory port (MportR). The received data frames use Rport and MportR. The received link frames, except for acknowledge frames, use Rport and MIPSportR.

The primary function of DMAC2 is to provide data transfer interface between the transmit activated blocks, i.e., Transmit buffer Logic (Tport), Transmit Sequence State Machine (TSport), MIPS engine (MIPSportT), Host memory port (HportT), and local memory port (MportT). The transmitted data frames use Tport and MportT. The transmitted link frames, except for acknowledge frames, use Tport and MIPSportT. The transmitted acknowledge frames use Tport and TSport.

The MIPS processor 38 of FIG. 3 comprises the commercially available MIPS processor and includes the basic MIPS engine, Data Cache, Instruction Cache, and MIPS firmware.

The primary functions which are recognized in the hardware and Completed by MIPS firmware are primitive sequence processing and link management, sequence and exchange management, classes of service, reassembly of sequences, and transmission of sequences.

Primitive sequence processing and link management— Primitive sequences are recognized in hardware by NL_Core, and the link status is provided to MIPS engine. MIPS processes link status and updates link state machine. MIPS firmware generates an appropriate control signal to transmit a primitive sequence. NL_Core transmits primitive sequence, as programmed by MIPS.

Sequence and exchange management—All the abnormal terminations of sequences and exchanges are handled by MIPS firmware. Successful complete sequences are handled by MIPS firmware. Each individual frame is handled in the hardware by NL_Core, RSSM and TSSM. Hardware (NL_Core) generates exchange_context, whenever the current OX_ID is not equal to the previous OX_ID. Whenever exchange_context is generated, sequence_context is also generated. If current OX_ID is equal to the previous OX_ID and current SEQ_ID is not equal to previous SEQ_ID, then sequence_context is generated by NL_Core.

OX_ID is used as handle to search exchange entry in the exchange information buffer. If the current exchange is in the active and open list of exchanges, when exchange_context is observed, then RSSM/TSSM update the information. If not, RSSM/TSSM interrupts MIPS to fetch the exchange status block from local memory, and update the active and open exchange information in the exchange information buffer. Since sequence is one level lower than the exchange, MIPS fetches sequence information whenever the exchange information is fetched. If the current exchange is in the active and open list of exchanges, when exchange_context is observed, and if current sequence is in the active and open list of sequences when sequence_context is observed, then RSSM/TSSM update the exchange and sequence information and perform appropriate action. If not, RSSM/TSSM< interrupts MIPS to fetch the sequence status block from local memory (if it is not available, then it is fetched from host memory), and update the active and open sequence information in the exchange information buffer.

Since completed sequences and abnormally terminated sequences are handled by MIPS firmware, all the exchange status block updates and exchange management is performed by MIPS.

Classes of service—All the classes of service are recognized in NL_Core, and processed by RSSM and TSSM to process and generate the ACKNOWLEDGE frames (ACK_1 and ACK_0 frames). MIPS firmware handles all the abnormalities with classes of service and processing of ACK_N and generation of ACK_N (if used). ACK_N is not performed by RSSM and TSSM. Intermix faults are detected in hardware (NL_Core), but the processing is done by MIPS.

Reassembly of Sequences—Reassembly of sequences using offset: NL_core is programmed with the base address of the sequence Storage. For every frame in the sequence, NL_Core computes the relative offset, the start address to store the frame and the length of the frame. This is used by RSSm to program DMA to transfer the payload to an appropriate area in the local memory, if it is large, or else to host memory. RSSM recognizes the reception of all frames of a sequence, and interrupts MIPS. MIPS interrupts for the reception of complete block of data.

Reassembly of sequences using SEQ_CNT: This is used, if offset is not programmed. RSSM programs the DMA to store the payloads in the order received, and RSSM builds a table indexed by SEQ_CNT and entries are the data starting address in the local memory and the length of frame. This table is built in the area programmed by MIPS (this table may be maintained at host memory, in which case host will allocate appropriate area). RSSM recognizes the reception of all frames of a sequence, and interrupts MIPS. If the local memory is large enough to store complete block of data, then MIPS programs the DMA to host bus to send the frame of data, in the order provided by the table. In the worst case, MIPS will programming DMA to send a sequence to host, as many times as the number of frames in the sequence, i.e., all the frames are received in out of order. If the local memory is not large enough to accommodate the entire sequence, all the frame data is sent to host memory, and the tables are also written in host memory. MIPS interrupts the reception of a complete sequence to host, and host build the block of data using the SEQ_CNT—Start Address table.

Transmission of Sequences—Transmission of sequences cam be handled entirely by hardware using Hardware Managed Sequence (HMS) feature provided by the NL_Core. The header for the last frame of sequence needs to be programmed by MIPS. The header for the first frame needs to be provided by host. The continuous data is provided to Payload Buffer through DMA from host memory.

If transmission does not want to use HMS, it can transmit frames using the single frame transmission path provided by NL_Core.

The MIPS firmware specification for implementing FC-2signal (framing) protocol is as follows:

Login and Service Management

The login procedure is a method by which an N_port establishes its operating environment with a Fabric, if present, and other destination N_ports with which it communicates. Two types of login mechanisms are available, Implicit and Explicit. Explicit login replaces previous service parameters and initializes end-to-end (EE) credit, and buffer-to-buffer (BB) credit. Explicit login also provides the means to communicate in different classes of service with agreeable operating conditions between two N_ports.

The sub modules are Fabric Login, N_Port Login, Logout, and N_port service parameters. These sub-modules are described as follows:

Fabric Login

Determining the presence or absence of a Fabric

Providing a specific set of operating characteristics associated with the entire Fabric, if Fabric is present.

Optionally assigning or confirming the native N_port identifier of the N_port which initiated the login, if Fabric is present.

Initializing buffer-to-buffer credit, if Fabric is present.

Accepting with specification of N_port in which common service parameters indicate that the requesting N_port is attached in a point-to-point topology.

The sub-functions performed are:

FLOGI service

Responding to FLOGI and analyze the response to FLOGI

Determining the classes of support provided by Fabric

Determining BB credit, EE credit

N_port Login

If fabric is not present, then the port must behave like N_port in the point-to-point topology. The primary objectives of N_port login are:

To exchange the service parameters for different classes of service, which determine offset management, ACK management, EE credit, etc.

To exchange the common service parameters

To establish BB credit limit.

The sub-functions performed are:

PLOGI service

Responding to PLOGI and analyzing the response to PLOGI

Determining the classes of support provided by the other N_port

Determining the BB credit, EE credit

Logout

The destination logout procedure provides a method for removing service between two N_ports. Logout releases resources associated with maintaining services with a destination N_port.

Explicit logout uses LOGO extended link service. Implicit logout occurs if N_port receives or transmits NOS or OLS primitive sequence.

$N_{13}$ port service parameters

This subsection describes the usage of service parameters for PLOGI transmission and reception. The service parameters consist of:

Common service parameters - - - FC-PH version, BB credit, relative offset. BB data receive size, total number of concurrent sequences, timers Names - - - port name, mode/fabric name Service parameters for class 1, 2, and 3 - - - class validity, service options, initiator control, recipient control, receive data size, EE credit, number of open sequences per exchange To transmit PLOGI, all the service parameters are prepared by ULP and communicated to MIPS, PLOGI frame is prepared by MIPS. The response received for PLOGI transmitted, is analyzed by MIPS.

To receive PLOGI, all the service parameters are interpreted by MIPS and the credit limits are programmed (provided to TSSM). The responses to PLOGI is generated by MIPS.

Block Construction

This section describes the process of block construction. A block or sub-block at ULP, is a sequence at FC-2. Therefore, sub-blocks are exactly treated same way as that of blocks. If offset is not used, sequences are constructed using SEQ_CNT in the frame header.

If offset is used, RSSM recognizes that all frames of a sequence are received, and interrupts MIPS to transfer the sequence (block) of data to be transferred to ULP. MIPS programs DMA once to transfer the entire block to host.

If offset is not used, RSSM recognizes that all frames of a sequence are received and interrupts MIPS to transfer the sequence (block) of data to be transferred to ULP. If local memory stores the frame data of sequence. MIPS looks at the SEQ_CNT—Start address table of a sequence, and checks for contiguous data areas and programs DMA per each contiguous data sub-block. If the local memory is not used for frame data, then the host is interrupted at the end of sequence reception. Host construct the block using the SEQ_CNT—Start address Exchange Management Exchange management consists of three phases. These phases are new exchange origination, continuance of an exchange and termination of exchange. All three phases exist after the login procedure is completed, which itself is an exchange.

New Exchange

A new exchange is originated when the following three conditions are met:

Login is performed with destination N_port.

Originating N_port OX_ID assigned and the resources are available to use.

Originating N_port is able to initiate sequence

Actions to be performed are:

Every frame in the first sequence, set F_CTL first_sequence bit to 1.

The first frame of the first sequence should indicate the error policy (F_CTL bits)

The first data frame responder exchange indentification (RX_ID) is set to 'FFFF'.

If X_ID interlock is required for class 1/2 frames, wait for the ACK before the subsequent data frames are delivered.

Wait for at least one ACK for the sequence transmitted (class 1 and 2 service) before the subsequent sequences are transmitted.

Follow all the rules for assigning and re-assigning X_IDs.

Continuance of Exchange

Exchange management stage as long as there are sequences to be transmitted from the N_port which has SEQUENCE INITIATIVE. New sequence is initiated following the sequence initiation rules.

Termination or exchange

The termination of an exchange is based on the rules:

Last sequence of an exchange shall be indicated by last_sequence bit set to 1.

Exchange shall be terminated when last sequence is completed by normal sequence completion rules.

Abnormal termination may be performed with reception or transmission of ABTX abort exchange frame. A recovery Qualifier range timeout may be required in class 2 and 3.

Exchange abnormally terminated following logout with another N_port. A recovery Qualifier range timeout may be required in class 2 and 3.

Link Control Handling

The link control consists of three major functions:

Link Response to Data Frames

Basic Link Services

Extended Link Services

Link Responses to Data Frames

Link responses to data frames could be successful or unsuccessful. A successful link response consists of R_RDY for BB flow control frames (SOFcl, class 2 and class 3 frames) and an ACK frame for class 1 and 2 data frames. An unsuccessful link response is received only for class 1 and class 2 data frames. Unsuccessful link response is F_BSY.P_BSY.F_RJT, and P_RJT.

Successful link responses generation and reception are dealt by RSSM and TSSM, where as unsuccessful responses are dealt by MIPS firmware.

F_BSY: response for data frames or link frames is indicated by R_CTL bits. In class 1, only SOFc1 gets busy response. In class 2, any data frame or ACK frame receive busy response. In class 3, busy is not used. The reasons for non delivery is indicated by TYPE field, which could be either N_port busy of Fabric busy.

P_BSY: response for data frames or link frames is indicated by R_CTL bits. In class 1, only SOFc1 gets busy response. In class 2, any data frame of ACK frame receive busy response. In class 3, busy is not used. The busy reasons are indicated by PARAMETER field, which could be sequence terminated and retry or sequence active and retry of physical N_port busy or N_port resource busy or vendor unique busy.

F_RJT: Fabric may reject a data frame for various reasons, reason code is presented as part of the link_response frame. Fabric may reject link_control frame for the following reasons: class not supported, invalid D_ID, invalid S_ID, N_port not available, login required.

P_RJT: N_port rejects link_control frame for the following conditions: unexpected ACK, unexpected link_response.

Basic Link Services the following basic link services generation and processing are performed by MIPS firmware:

Abort Sequence (ABTS)

No operation (NOP)

Remove Connection (RMC)

Basic Accept (BA_ACC)

Basic Reject (BA_RJT)

Extend Link Services

The following extended link services generation and processing is performed by MIPS firmware:

Abort Exchange (ABTX)

Advise Credit (ADVC)

Echo (ECHO)

Establish Streaming (ESTS)

Estimate Credit (ESTC)

Login (FLOGI/PLOGI)

Logout (LOGO)

Read Connection Status (RCS)

Read Exchange Status Block (RES)

Read Link Error Status Block (RLS)

Read Sequence Status Block (RSS)

Read Timeout Value (RTV)

Reinstate Recovery_Qualifier (RRQ)

Request Sequence Initiative (RSI)

Test (TEST)

Connection Management

Connection management consists of three phases: Initiate connection, continuation of connection, and remove connection. Initiate connection, service parameters are passed to MIPS from host. MIPS performs establishing connection. Continuation of connection is managed by RSSM and TSSM. MIPS is intervened for only exceptional conditions.

Remove connection parameters are pass from host to MIPS. MIPS prepares RMC frame and transmits through NL_Core.

Error Detection and Recovery

The following link error recovery functions are performed by MIPS firmware:

Timeouts

Link Error Detection and Recovery

Link Error Status Blocks

Sequence Recovery

Exchange Integrity

The following are descriptions of specific FC-2 functions using the Super Core hardware:

Sequence Construction

This section describes the process of sequence construction. If offset is not used, sequences are constructed using SEQ_CNT in the frame header.

If offset is used, the relative offset for each frame is indicated by PARAMETER field in the frame header. NL_Core has to be programmed with the Base starting address for the entire data of a sequence. Starting address for each frame data, is computed by the NL_Core and is placed in the header buffers using Frame Interface Formats. RSSM programs DMA controller 1 accordingly to write the data into local memory, if it is large, or else to host memory. RSSM updates exchange and sequence information at every time RSSM processes a data frame. RSSM recognizes that all frames of a sequence are received, and interrupts MIPS to transfer the sequence (block) of data to be transferred to ULP.

If offset is not used, RSSM programs the DMA to store the payload in the order received, and RSSM builds a table indexed by SEQ_CNT and entries are the data starting address in the local memory and the length of frame. This table is build in the area programmed by MIPS (this table may be maintained at host memory, in which case hot will allocate appropriate area). RSSM recognizes the reception of all frames of a sequence, and interrupts MIPS. If the local memory is large enough to store complete block of data, then MIPS programs the DMA to host bus to send the frame of data, in the order provided by the table. In the worst case, MIPS will programming DMA to send a sequence to host, as many times as the number of frames in the sequence, i.e. all the frames are received in out of order. If the local memory is not large enough to accommodate the entire sequence, all the frame data is sent to host memory, and the tables are also written in host memory. MIPS interrupts the reception of a complete sequence to host, and host build the block of data using the SEQ_CNT—Start Address table.

Context Switches

This section describes hardware handling of sequence and exchange context switches. The efficiency of the fibre channel solution is severely effected by the sequence and exchange context switch management.

NL_Core generates exchange_context, whenever the current X_ID is not equal to the previous X_ID. Whenever exchange_context is generated, sequence_context is also generated, since the sequence is lower level data construct than exchange. If current X_ID is equal to the previous X_ID and current SEQ_ID is not equal to previous SEQ_ID, then sequence_context is generated by NL_Core.

RSSM can be pro-active in the receive path to take care of the sequence and exchange context switches. If the required sequence and exchange information is not available through ESMBL interface, the MIPS is interrupted for corresponding sequence and exchange tables. RSSM does not store the status blocks in the entirety, only the required information is stored. If any entry needs to be deleted from ESMBL, the sequence and exchange information is stored back in the local memory.

End to End Flow Control

This section describes the end to end flow control, which involves the ACK generation and processing, and end-to-end credit management. End-to-end credit is agreed upon during the login. As a sequence initiator, when a class ½ frame is transmitted the credit count is decremented, and the ACK received the credit count is incremented.

ACK_1 and ACK_0 reception is precess by RSSM. For an ACK_1 or ACK_0 received, RSSM accesses sequence and exchange information and updates the information. RSSM increments end-to-end credit so that more frames can be transmitted. If ACK0 is received i.e., entire sequence is acknowledged. RSSM interrupts MIPS since complete sequence is acknowledged.

For every data frame received, the RSSM updates the sequence and exchange information. ACK_1 frame is prepared by the TSSM, and is written into LF buffer. If NL_Core is not transmitting any other frame. ACK frame is transmitted. If multiple frame sources are ready to transmit. NL_Core transmits link frames first. If NL_Core is in the middle of transmission of a frame, at the end of the transmission completion ACK is transmitted. During HMS transmission, in between frames ACKs are transmitted.

Intermix Handling

This section describes intermix handling. During class 1 sequence reception, if a class ⅔ frame received, class ⅔ frame is steered to HBB buffer. But, sequence validity checking is performed on class 1 frames only.

Intermix transmission, only one sequence is programmed to be transmitted in the HMS. Therefore, during a class 1 sequence, one or more class ⅔ frames can be transmitted using HBB buffer path, but not a sequence through HMS. Frame steering to appropriate staging buffers is controlled by TSSM. Frame transmission from multiple sources is handled by NL_Core.

If a class ⅔ sequence is to be transmitted using class 1 connection, then there is a lot of intervention by MIPS and TSSM (since this is similar to a single frame construction).

Hardware Managed Sequences

This section describes mechanisms to perform hardware managed sequences. During sequence reception, sequence validity is performed on only class 1 sequence, if the service is connection oriented (or intermix is allowed). Sequence validity can be used for class ⅔ sequences, if fabric guarantees the order of delivery. RSSM programs NL_Core to perform sequence validity checking on incoming sequences. NL_Core reports the errors to RSSM.

During sequence transmission, HMS can manage only one sequence at a time. MIPS programs TSSM indicating block of data to be transmitted, class of service, first/intermediate/last sequence being transmitted. TSSM programs DMAC 2 to load payload buffer, and writes the first header to HCl (class 1 transmission) or HBB buffer (class ⅔ transmission), and programs $NL_{13}$ Core to perform HMS. NL_Core prepares header for every frame in the sequence, reads optional headers (if present) from HBB/HCl buffers, and generates SOF/EOF delimiters and CRC. For class 1 service. SOFcl frame is prepared by MIPS and TSSM programs DMAC 2 to write the frame into link frame buffers.

Connection Management

Connection management consists of three phases: Initiate connection, continuation of connection, and remove connection. Initiate connection service parameters are passed to MIPS from host. MIPS performs establishing connection. Continuation of connection is managed by RSSM and TSSM. MIPS is intervened for only exceptional conditions.

Remove connection parameters are pass from host to MIPS. MIPS prepares RMC frame and transmits through NL_Core.

Sequence TimeOut Management

This section describes sequence timeout management. A list of software timers are maintained in the local memory in a tabular form. This table is indexed by X_ID and SEQ_ID, and the content is always the time stamp of timer expiration. Whenever, a DATA frame or ACK frame received. SEQ_ID timer is stamped with current time plus E_D_TOV. If E_D_TOV timer is expired. MIPS is interrupted. This information will be maintained as part of the exchange and sequence information. Since all open and active sequences can not be accommodated in the super core, the rest of the open active sequences timer expiration is checked by MIPS. RSSM updates all the timers for ACKs received. RSSM updates all the timers for Data frames received, and TSSM generates ACKs for the DATA frames received).

The following are descriptions of Super Core signals that comprise the bit level (logical) interface of the Fibre Channel NL_Port Super Core:

Fibre Optic Module Interface

All the interface signals between the Fiber Optic Module (FOM) and the Super core interface through NL_Core. The Decode Word Module receives all incoming signals from the Fiber Optic Module (FOM). This includes recovered receive data, data width control, and status from both the transmit and receive FOMs. The Encode Word Module provides all outgoing data and control signals to the FOM. This includes the parallel transmission data and control for both the transmit and receive FOMs.

| Signal | Description | Direction |
|---|---|---|
| FDB_IN[19:0] | FOM Data In<br>These signals contain two 10 bit FCS characters from the FOM.<br>See subsection entitled "Decode_word Interface Formats" on page 4–24 for the pin format. | Input |
| BYTE_SYNC | FOM Byte Sync<br>Asserting this signal indicates that there is a Special Character (the first character of all ordered sets) or a comma to be read on FDB_IN[19:0]. The FOM should assert this signal HIGH every time it detects a comma character. | Input |
| LASER_STATUS | FOM Transmitter Laser Fault<br>Asserting this signal HIGH indicates that the FOM transmitter is detecting no laser output. The Receive passes this signal along as the STATUS_REG10 output. | Input |
| LINK_STATUS | FOM Receiver Loss of Light (Open Fibre)<br>Asserting this signal HIGH indicates that the FOM receiver is detecting no signal. This signal is an input into the Receive State Machine. The Receive passes this signal along as the STATUS_REG9 output. | Input |
| UL_SELECT | 10 bit upper/lower select<br>When using 10 bit FOMs, this input selects whether the 10 bit FOM input to the Receive is received in the upper 10 bits or the lower 10 bits of the 20 bit FDB_IN[19:0] interface. | input |
| 10_20_SELECT | 10 bit/20 bit select<br>Asserting this signal HIGH configures the Receive to accept 10 bit FOM inputs. Deasserting this signal LOW configures the Receive to accept 20 bit FOM inputs. | input |
| LINK_CONTROL | Enable FOM Laser<br>The Encode asserts this signal HIGH to turn on the FOM transmit laser. | Output |
| LOCK_REF | Enable FOM Lock to Reference<br>The Encode asserts this signal HIGH to force the receive Phase Lock Loop (PLL) to lock to the reference oscillator. | Output |
| LOOP_ENABLE | FOM Loop-Back Enable<br>The Encode asserts this signal HIGH to route FOM output to FOM input. | Output |
| ENCODE_TYPE | FOM Type Select<br>Asserting this signal HIGH configures the Encode to send 10-bit FOM outputs. | input |

| | | |
|---|---|---|
| LOOP_CTL | Deasserting this signal LOW configures the Encode to send 20-bit FOM outputs. FOM Loop-Back control Asserting this signal HIGH enables Encode to generate LOOP_ENABLE signal. This a active in both 10 bit and 20 bit mode. | Input |
| LOCK_REF_CTL | FOM Lock to Reference Control Asserting this signal HIGH enable Encode to drive LOCK_REF output pin in either 10 bit or 20 bit mode. | Input |
| LASER_ON | FOM Laser On Asserting this signal HIGH enables Encode to drive LINK_CONTROL output signal in either 10 bit or 20 bit mode. | Input |
| FDB_OUT[19:0] | Fibre Data Out These signals contain two 10-bit FCS characters that go to the FOM. See subsection entitled "Encode_word Interface Formats" page 4–25 for the pin format | Output |

Memory Interface

These signals provide interface to local memory. There are two paths to local memory, one from DMAC1 and the other from DMAC2.

| | | |
|---|---|---|
| DATABUS1[31:0] | Data Bus These signals provide the word data bus to read and write local memory contents by through DMAC1. | Output |
| READ1 | Memory Read Request The DMAC1 asserts this signal HIGH, when local memory word read needs to be performed. | Output |
| WRITE1 | Memory Write Request The DMAC1 asserts this signal HIGH, when local memory word write needs to be performed. | Output |
| ADDR1[31:0] | Address Bus These signals provide the address of the location in local memory to be accessed by DMAC1. | Output |
| DATABUS2[31:0] | Data Bus These signals provide the word data bus to read and write local memory contents by through DMAC2. | Output |
| READ2 | Memory Read Request The DMAC2 asserts this signal HIGH, when local memory word read needs to be performed. | Output |
| WRITE2 | Memory Write Request The DMAC2 asserts this signal HIGH, when local memory word write needs to be performed. | Output |
| ADDR2[31:0] | Address Bus These signals provide the address of the location in local memory to be accessed by DMAC2. | Output |

Host Interface

Host interface consists of all the data, address and control signals between Super core and host. This is dependent on the host bus. Any custom specified bus signals may not provide correct information.

Control and Status Signals

These signals provide status and control signals of super core.

Test and Scan

The Test and Scan Interface controls the scan test mechanism that is used for ASIC production tests.

| | | |
|---|---|---|
| TAI | Asynchronous Clear Enable Asserting this signal HIGH disables all flip-flop asynchronous sets or resets during the scan process. | Input |
| TMOD | Test Mode Asserting this signal HIGH puts all flip-flops in the test mode for scan. | Input |
| TSDI | Scan Data In This signal feeds the first flip-flop of the scan chain. | Input |
| TDSO | Scan Data Out This signal is fed by the last flip-flop of the scan chain. | Output |

Clock Out

The Clock Out Interface feeds condition versions of the source clock to external circuits.

| | | |
|---|---|---|
| R_WORD_CLK | Receive Word Clock This word clock is derived from R_CLK. R_CLK divided by two drives this output for 20 bit mode and R_CLK divided by four in 10 bit mode. | Output |
| T_WORD_CLK | Transmit Word Clock This word clock is derived from T_CLK. T_CLK divided by two drives this output for 20 bit mode and T_CLK divided by four in 10 bit mode. | Output |
| T_CLK_OUT | Copy of the T_CLK Clock input This is a buffered version of T_CLK and may be used elsewhere. | Output |
| R_CLK_OUT | Copy of the R_CLK Clock input This is a buffered version of R_CLK and may be used elsewhere. | Output |

Clock In

Clock In Interface takes clock sources from FOM modules.

| | | |
|---|---|---|
| R_CLK | Receiver Recovered Clock The FOM byte clock inputs this signal. It should cycle once every two 10-bit characters if in 20-bit mode, or once every one 10-bit character in 10-bit mode. This clock must have one of the following nominal frequencies ± 100 PPM: | Input |

| FCS Speed | Frequency (in MHz) |
|---|---|
| Full | 53.125 |
| Half | 26.5625 |
| Quarter | 13.28125 |
| Eighth | 6.640625 |

| | | |
|---|---|---|
| T_CLK | Transmitter Clock The FOM byte clock inputs this signal. It should cycle once every two 10-bit characters if in 20-bit mode, or once every one 10-bit character in 10-bit mode. This clock must have one of the following nominal frequencies ± 100 PPM: | Input |

| FCS Speed | Frequency (in MHz) |
|---|---|
| Full | 53.125 |
| Half | 26.5625 |
| Quarter | 13.28125 |
| Eighth | 6.640625 |

| | | |
|---|---|---|
| NL_RESET | Assertion of this signal puts all the sequential elements in te NL_Core in its reset state. | Input |

There has been described an architecture for a super core in implementing the FC-1 transmission protocol for serial encoding, decoding, and error control (8 bit/10 bit code) and the FC-2 signalling (framing) protocol in defining frame structures and byte sequences used in the Fibre Channel to transfer data (transport mechanism). The modular functional structure provides efficient physical layout as well as operational implementation. The Super Core organization lends itself to incorporation with other custom circuitry in application specific integrated circuits and can be readily incorporated in a design library.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A Super Core integrated system for use in a communication environment such as fibre channel for encoding and decoding data and implementing frame structures and byte sequences within a node port comprising core circuitry for encoding and decoding data and error checking said data, staging buffers connected with said core circuitry including Receive Buffer Logic and transmit buffer logic, said Receive Buffer Logic and said transmit buffer logic including buffers for frame headers and link frames and providing control to read and write from headers and link frames in buffers base on programmed steering, buffer status register files for storing status of header and link buffers in said Receive Buffer Logic and said write buffer logic, direct memory access control means for providing a data transfer interface to a local/host memory, an embedded processor for facilitating data transfers to and from local/host memory, a Receive Sequence State Machine coupled to said core circuitry, said staging buffers, said buffer status register files, said processor, and said direct memory access control means, said Receive Sequence State Machine controlling the transfer of data frames to memory including updating sequence and exchange information and generating interrupts to said processor when all data frames of a sequence are received, when termination of a sequence is received, when link control frames are received, and upon receipt of partial sequence data, a Transmit Sequence State Machine coupled to said core circuitry, said staging buffers and said buffer status register files, said processor and said direct memory access control means, said Transmit Sequence State Machine controlling transmission of data sequences and link frames from host memory to staging buffers, and an Exchange and Sequence Management Buffer Logic connected with said processor, said Receive Sequence State Machine, and said Transmit Sequence State Machine, said Exchange and Sequence Management Buffer Logic providing control of exchange and sequence status information and including storage buffers for exchange information and sequence information of data exchange to and from memory through said Receive sequence State Machine and said Transmit Sequence State Machine.

2. The Super Core integrated system as defined by claim 1 wherein said direct memory access control means includes a first direct memory access controller connected between said Receive Sequence State Machine and a local/host memory to provide a data transfer interface for received data frames and received link frames, and a second direct memory access controller connected between said Transmit Sequence State Machine and a local/host memory to provide a data transfer interface for transmit data frames and transmit link frames.

3. The Super Core integrated system as defined by claim 1 wherein said processor handles exceptional conditions, processes and generates primitive sequences, processes arbitration, controls said direct memory access control means in sending and receiving blocks of data, and performs all link control frame processing.

4. The Super Core integrated system as defined by claim 1 wherein said core circuitry includes a decode word means for conversion of 10-bit data to 8-bit data with error checking, recognizing a comma character, constructing 32 bit parity protected words from half words or bytes, and providing decode error, an encode word means for conversion of 8-bit data to 10-bit data, generating comma characters, and constructing half words or bytes from 32 bit parity protected words, an arbitrated loop for performing loop initialization protocol and loop arbitration functions, a receive unit for frame parsing, frame steering, error checking, primitive detection, and offset computation, and a transmit unit for frame construction, CRC generation, and primitive generation.

5. The Super Core integrated system as defined by claim 1 wherein said Receive Sequence State Machine includes a processor interface for generating interrupts, a direct memory access controller interface for transferring data from staging buffers in said Receive Buffer Logic to local/host memory, a buffer status register file interface, an Exchange and Sequence Management Buffer Logic interface to access and update exchange and sequence status information, a process acknowledgement unit for processing acknowledgements and updating exchange and sequence information, and a control unit for all units of said Receive Sequence State Machine.

6. The Super Core integrated system as defined by claim 1 wherein said Transmit Sequence State Machine includes a program DMA unit to program said direct memory access control means for the transmission of activated blocks, write an acknowledgement frame to said transmit buffer logic, read exchange and sequence status blocks, and to transfer data from local/host memory to staging buffers in said transmit buffer logic, an Exchange and Sequence Management Buffer Logic interface for accessing and updating exchange and sequence status information of active and open exchanges and sequences, and to write information of active and open exchanges, a buffer status register files interface for checking availability of header buffers and link buffers, a generate acknowledgement unit for generating acknowledgements and updating exchange and sequence information, a Transmit Sequence State Machine control unit for controlling other units including programming said direct memory access control means to write headers in response to availability of header buffers and link buffers, updating sequence and exchange information of transmitted frames, controlling sequence identification and exchange identification to Exchange and Sequence Management Buffer Logic interface for search and exchange information, and controlling said generate acknowledgement unit to transmit an acknowledgement frame and update exchange and sequence information, and a processor interface for programming said Transmit Sequence State Machine to transmit a sequence of data, a single frame of data, and a link frame, generating interrupts to said processor under exceptional conditions, at the end of transmission of a frame sequence from local/host memory, at the end of an exchange, and when an exchange search or sequence search on Exchange and Sequence Management Buffer Logic fails.

7. The Super Core integrated system as defined by claim 1 wherein said Exchange and Sequence Management Buffer Logic includes an exchange sequence interface pseudo cache including tags and data fields, a pseudo cache control unit for acquiring a tag being searched, indicating cache hit success and failure when asked for exchange and sequence information, and providing read/write control signals to said P cache, a Receive Sequence State Machine interface for providing a tag being searched by said Receive Sequence State Machine, and acquiring cache hit success and fail from P cache control and providing to said Receive Sequence State Machine, and a Transmit Sequence State Machine interface for providing a tag being searched by said Transmit Sequence State Machine, and acquiring cache hit success and fail from P cache control and providing to said Transmit Sequence State Machine.

8. The Super Core integrated system as defined by claim 1 wherein said Receive Buffer Logic includes Write Control Logic for receiving buffer write control and frame steering signals from said core circuitry, first buffers for holding headers and entire link control frames, for a class 1 service, second buffers for holding headers and entire link control frames for class 2/3 service, a payload buffer for holding payloads of class 1, class 2, and class 3 frames, and read control logic for reading from buffers.

9. The Super Core integrated system as defined by claim 1 wherein said transmit buffer logic includes Write Control Logic for receiving buffer write control and frame steering from said Transmit Sequence State Machine, first buffers for holding headers of a class 1 service, second buffers for holding headers of a class 2/3 service, third buffers for holding entire link frames to be transmitted, a payload buffer for holding payloads of class 1, class 2, and class 3 frames, and read control logic for reading from buffers.

10. The Super Core integrated system as defined by claim 1 wherein said buffer status register files includes multi-port register files for storing status of header and link buffers and interfacing with said processor, said Receive Buffer Logic, said Receive Sequence State Machine, said transmit buffer logic, said Transmit Sequence State Machine.

11. A Super Core integrated system for use in a fibre channel communication environment for encoding and decoding data and implementing frame structures and byte sequences within a node port comprising a) core circuitry for encoding and decoding data and error checking said data, said core circuitry including a decode word means for conversion of 10-bit data to 8-bit data with error checking, recognizing a comma character, constructing 32 bit parity protected words from half words and bytes, and providing decode error, an encode word means for conversion of 8-bit data to 10-bit data, generating comma characters, and constructing half words and bytes from 32 bit parity protected words, an arbitrated loop for performing loop initialization protocol and loop arbitration functions, a receive unit for frame parsing, frame steering, error checking, primitive detection, and offset computation, and a transmit unit for frame construction, CRC generation, and primitive generation, b) staging buffers connected with said core circuitry including Receive Buffer Logic and transmit buffer logic, said Receive Buffer Logic and said transmit buffer logic including buffers for frame headers and link frames and providing control to read and write from headers and link frames in buffers based on programmed steering, said Receive Buffer Logic including, Write Control Logic for receiving buffer write control and frame steering signals from said core circuitry, first buffers for holding headers and entire link control frames, for a class 1 service, second buffers for holding headers and entire link control frames for class 2/3 service, a payload buffer for holding payloads of class 1, class 2, and class 3 frames, and read control logic for reading from buffers, said transmit buffer logic including Write Control Logic for receiving buffer write control and frame steering from said Transmit Sequence State Machine, first buffers for holding headers of a class 1 service, second buffers for holding headers of a class 2/3 service, third buffers for holding entire link frames to be transmitted, a payload buffer for holding payloads of class 1, class 2, and class 3 frames, and read control logic for reading from buffers, c) buffer status register files for storing status of header and link buffers in said Receive Buffer Logic and said write buffer logic, said buffer status register files including multi-port register files for storing status of header and link buffers and interfacing with said processor, said Receive Buffer Logic, said Receive Sequence State Machine, said transmit buffer logic, said Transmit Sequence State Machine, d) direct memory access control means, including a first direct memory access controller connected between said Receive Sequence State Machine and a local memory to provide a data transfer interface for received data frames and received link frames, and a second direct memory access controller connected between said Transmit Sequence State Machine and a local memory to provide a data transfer interface for transmit data frames and transmit link frames, e) an embedded processor, for handling exceptional conditions processes and generates primitive sequences, processes arbitration, controls said direct memory access control means in sending and receiving blocks of data, and performs all link control frame processing, f) a Receive Sequence State Machine coupled to said core circuitry, said staging buffers, said buffer status register files, said processor, and said direct memory access control means, said Receive Sequence State Machine controlling the transfer of data frames to memory including updating sequence and exchange information and generating interrupts to said processor when all data frames of a sequence are received, when termination of a sequence is received, and when link control frames are received, said Receive Sequence State Machine including

- a processor interface for generating interrupts,
- a direct memory access controller interface for transferring data from staging buffers in said Receive Buffer Logic to memory,
- a buffer status register file interface,
- an Exchange and Sequence Management Buffer Logic interface to access and update exchange and sequence status information,
- a process acknowledgement unit for processing acknowledgements and updating exchange and sequence information, and
- a Control unit for all units of said Receive Sequence State Machine, g) a Transmit Sequence State Machine coupled to said core circuitry, said staging buffers and said buffer status register files, said processor and said direct memory access control means, said Transmit Sequence State Machine controlling transmission of data sequences and link frames from memory to buffers, said Transmit Sequence State Machine including

- a program DMA unit to program said direct memory access control means for the transmission of activated blocks, write an acknowledgement frame to said transmit buffer logic, read exchange and sequence status blocks, and to transfer data from local memory to staging buffers in said transmit buffer logic,
- an Exchange and Sequence Management Buffer Logic interface for accessing and updating exchange and sequence status information of active and open exchanges and sequences, and to write information of active and open exchanges,
- a buffer status register files interface for checking availability of header buffers and link buffers,
- a generate acknowledgement unit for generating acknowledgements and updating exchange and sequence information,
- a Transmit Sequence State Machine control unit for controlling other units including programming said direct memory access control means to write headers in response to availability of header buffers and link buffers, updating sequence and exchange information of transmitted frames, controlling Sequence identification and exchange identification to Exchange and Sequence Management Buffer Logic interface for search and exchange information, and controlling Said generate acknowledgement unit to transmit an acknowledgement frame and update exchange and sequence information, and
- a processor interface for programming said Transmit Sequence State Machine to transmit a sequence of data, a single frame of data, and a link frame, generating interrupts to said processor under exceptional conditions, at the end of transmission of a frame sequence from local memory, at the end of an exchange, and when an exchange search or sequence search on Exchange and Sequence Management Buffer Logic fails, and h) an Exchange and Sequence Management Buffer Logic connected with said processor, said Receive Sequence State Machine, and said Transmit Sequence State Machine, said Exchange and sequence Management Buffer Logic providing control of exchange and sequence status information and including storage buffers for exchange information and sequence information, said exchange and sequence information buffer logic including

- an exchange sequence interface p cache including tags and data fields,
- a P cache control unit for acquiring a tag being searched, indicating cache hit success and failure when asked for exchange and sequence information, and providing read/write control signals to said P cache,
- a Receive Sequence State Machine interface for providing a tag being searched by said Receive Sequence State Machine, and acquiring cache hit success and fail from P cache control and providing to said Receive Sequence State Machine, and
- a Transmit Sequence State Machine interface for providing a tag being searched by said Transmit Sequence State Machine, and acquiring cache hit success and fail from P cache control and providing to said Transmit Sequence State Machine.

* * * * *